May 7, 1968          H. RUCHLIS          3,381,381

RANGEFINDER

Filed Oct. 1, 1963

INVENTOR
HYMAN RUCHLIS

BY *John P. Hinck*

ATTORNEY

United States Patent Office 3,381,381
Patented May 7, 1968

3,381,381
RANGEFINDER
Hyman Ruchlis, Brooklyn, N.Y., assignor, by mesne assignments, to Harcourt, Brace & World, Inc., New York, N.Y., a corporation of New York
Filed Oct. 1, 1963, Ser. No. 313,117
1 Claim. (Cl. 33—64)

This invention relates in general to a rangefinder and more particularly to an extremely inexpensive rangefinder which is capable of approximating distances of varied objects of known height.

The fundamental mathematical theory on which rangefinders are based is the same. The rangefinder is usually constructed in the form of a telescope or an elongated tube having an eye piece on one end and an opening of variable diameter on the other end. The distance between the eye piece and the variable opening is usually fixed. When the variable opening has been adjusted so that an object which is sighted upon just fills the opening, the distance of this object is determined by multiplying its height by the ratio of the distance between the eye piece and the variable opening and the size of the variable opening that just spans the object being viewed.

It is a general object of the subject invention to provide a rangefinder which is capable of estimating the distance of a number of different objects of different heights and which rangefinder has no moving parts.

A more specific object of the subject invention is to construct a rangefinder of an elongated tube with a polygonal opening so that the sides of the polygon may be compared with the height of the object being viewed to determine its distance.

An additional object of the subject invention is to provide a rangefinder of the hereinbefore described type wherein the opening at each end of the elongated tube is in the form of a polygon.

These and other objects of the subject invention will become more fully apparent as the following description is read in light of the attached drawing, wherein.

Figure 1:
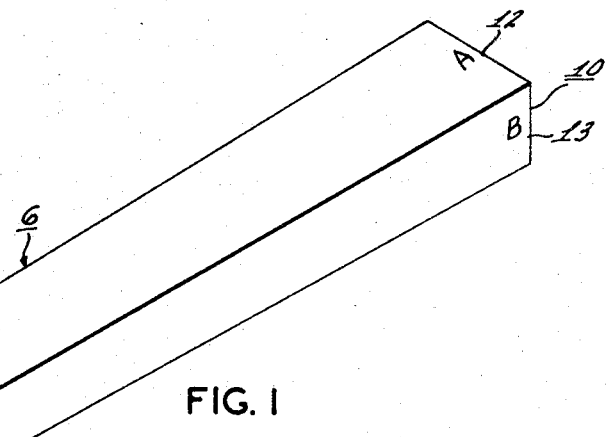
FIG. 1 is one modification of a rangefinder constructed in accordance with this invention.
Figure 2:
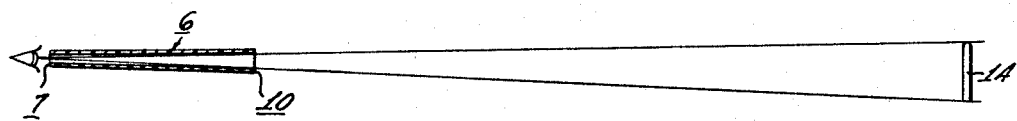
FIG. 2 shows the rangefinder of FIG. 1 as it is utilized to determine the distance of an object.

Referring to FIG. 1, an elongated tube generally designated 6 is constructed of a rectangular cross section. One end 7 of the member 6 has a cross sectional opening with a side 8 and a side 9 which forms a rectangle of any reasonable dimension. The other end 10 of the member 6 has a side 12 and a side 13 which form in cross section a rectangular opening with larger sides than the sides at end 7.

Each end 7 and 10 is provided with a multiplier such as A and B at end 10 and C and D at end 7. These multipliers are determined by dividing the dimension of a side into the distance between ends 7 and 10.

In operation, the user of the rangefinder sights through either end and attempts to line up a distant object such as 14 so that the height of the object 14 is just included in the opening of the rangefinder which is remote from the viewer's eye. With a rectangular rangefinder, as shown in FIG. 1, the viewer has four choices of sides with which to sight on the object 14. If the viewer sights through the end 10 and aligns the object 14 with the side 8 then to determine the distance of the object 14 from the viewer, the multiplier D is multiplied times the approximate height of the object 14.

Figure 3:
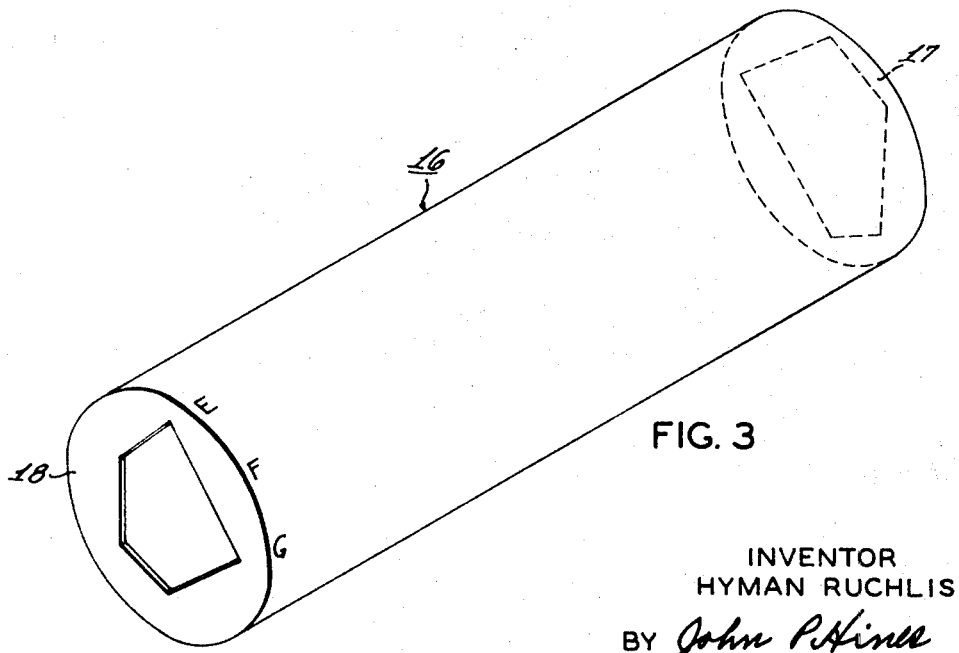
FIG. 3 is a modification showing a rangefinder wherein the distance of a greater number of objects of different heights can be determined.

Referring to FIG. 3, a modified form of rangefinder is shown. Similarly an elongated tube or box 16 defines a longitudinally extending sight opening through which the operator views the object. Either end or both ends 17 and 18 may be provided with an opening having a polygon shape. In this particular modification, the openings have five sides; however, it should be understood that any opening of three or more sides may be used. Each of these five sides is of a known length and this dimension when divided into the distance between the polygon openings gives the multipliers which are to be multiplied times the height of the object being viewed. The multipliers such as E, F, G for each side of the polygons may be provided about the periphery of the rangefinder 16 so that when the side being utilized is in a vertical position the multiplier is at the top of the rangefinder. With this device the operator sights upon an object and merely revolves the rangefinder until one of the sides of the polygon equals the height of the object being viewed. He then multiplies the known height of the object with the multiplier that is on the top of the rangefinder to thereby determine the distance of the object.

From the above description it can be seen that an extremely inexpensive yet practical rangefinder is disclosed. Although the rangefinder of this invention has no moving parts, an extremely large number of different combinations are possible because of the shape of the openings and also because both ends of the tube are utilized.

Although only one embodiment of the subject invention has been herein shown and described, other embodiments will be obvious to those skilled in the art after reading this description and it is intended that all such embodiments as come within a reasonable interpretation of the appended claim be covered.

The embodiments of the invention in which an exclusive property or privilege is claimed are defined as follows:

1. A rangefinder comprising an elongated tube with a longitudinally extending sight opening therethrough wherein the opening at each end of said tube is in the form of a polygon with no two sides of either polygon being equal, and means proportional to the length of each side of said polygons and the length of said tube imprinted on said tube in a manner so that each means may be quickly associated with the appropriate proportional polygon side.

References Cited

UNITED STATES PATENTS 2,189,964   2/1940   Sealey _____ 33—64
3,031,764   5/1962   Larson _____ 33—64

HARRY N. HAROIAN, Primary Examiner.

I. LISANN, Examiner.

D. McGIEHAN, Assistant Examiner.